US012612120B2

(12) United States Patent
Favaretto

(10) Patent No.: US 12,612,120 B2
(45) Date of Patent: *Apr. 28, 2026

(54) CAR

(71) Applicant: FERRARI S.P.A., Modena (IT)

(72) Inventor: Fabrizio Favaretto, Modena (IT)

(73) Assignee: FERRARI S.P.A., Modena (IT)

( * ) Notice: Subject to any disclaimer, the term of this patent is extended or adjusted under 35 U.S.C. 154(b) by 358 days.

This patent is subject to a terminal disclaimer.

(21) Appl. No.: 18/470,496

(22) Filed: Sep. 20, 2023

(65) Prior Publication Data

US 2024/0092434 A1 Mar. 21, 2024

(30) Foreign Application Priority Data

Sep. 21, 2022 (IT) ........................ 102022000019344

(51) Int. Cl.
*B62D 35/00* (2006.01)
*B62D 25/20* (2006.01)
*B62D 35/02* (2006.01)

(52) U.S. Cl.
CPC ............. *B62D 35/02* (2013.01); *B62D 25/20* (2013.01)

(58) Field of Classification Search
CPC ......... B62D 35/02; B62D 25/20; B62D 37/02
USPC ...................................................... 296/181.5
See application file for complete search history.

(56) References Cited

U.S. PATENT DOCUMENTS

| | | | | |
|---|---|---|---|---|
| 2014/0361578 A1* | 12/2014 | Kimura | ................. | B62D 35/02 |
| | | | | 296/180.1 |
| 2015/0367718 A1* | 12/2015 | Hayashi | ................. | B60L 50/66 |
| | | | | 180/68.5 |
| 2018/0281876 A1 | 10/2018 | Gilotte et al. | | |
| 2022/0033011 A1* | 2/2022 | Watanabe | ............ | H05H 1/2439 |
| 2024/0294216 A1* | 9/2024 | Favaretto | .............. | B62D 35/00 |

FOREIGN PATENT DOCUMENTS

| | | |
|---|---|---|
| EP | 1919758 A1 | 5/2008 |
| EP | 2788248 A1 | 10/2014 |
| JP | H04339079 A | 11/1992 |

OTHER PUBLICATIONS

Italian Search Report for Application No. 102022000019344, Filing Date: Sep. 21, 2022; Date of Mailing: May 9, 2023, 8 pages.

* cited by examiner

*Primary Examiner* — Steven O Douglas
(74) *Attorney, Agent, or Firm* — CANTOR COLBURN LLP

(57) ABSTRACT

A car has a support frame defining part of a lower floor of the car, and an aerodynamic bottom, which is at least partly fixed to the support frame, defines part of the lower floor, and has a rear bottom, which is mounted in the area of a rear zone of the car, and is provided with a pneumatic unit configured to blow a first air flow in the direction of a road surface and/or to suck part of a second air flow flowing under the lower floor during the normal operation of the car.

10 Claims, 4 Drawing Sheets

CAR

CROSS-REFERENCE TO RELATED APPLICATIONS

This patent application claims priority from Italian patent application no. 102022000019344 filed on Sep. 21, 2022, the entire disclosure of which is incorporated herein by reference.

TECHNICAL FIELD

The present invention relates to a car.

In particular, the present invention relates to a car of the type comprising a support frame defining part of a lower floor of the car; a passenger compartment mounted on the support frame and projecting upwards from the lower floor; a driving engine for moving the car; and an aerodynamic bottom fixed to the support frame and defining part of the lower floor.

BACKGROUND

The aerodynamic bottom comprises a front bottom mounted in a front zone of the car, a rear bottom mounted in a rear zone of the car, and a central bottom mounted in a central zone of the car.

Since the rear bottom has a profile designed based on a compromise between different driving situations and conditions, known cars of the type described above have some drawbacks, mainly deriving from the fact that the profile of the rear bottom means that the car's aerodynamics are incapable of adapting to different driving situations and conditions.

SUMMARY

The object of the present invention is to provide a car that overcomes the drawbacks described above and that is simple and inexpensive to manufacture.

According to the present invention, a car is provided as set forth in the appended claims.

BRIEF DESCRIPTION OF THE DRAWINGS

The present invention will now be described with reference to the attached drawings that illustrate a non-limiting embodiment thereof, in which.

DESCRIPTION OF EMBODIMENTS

Figure 1:
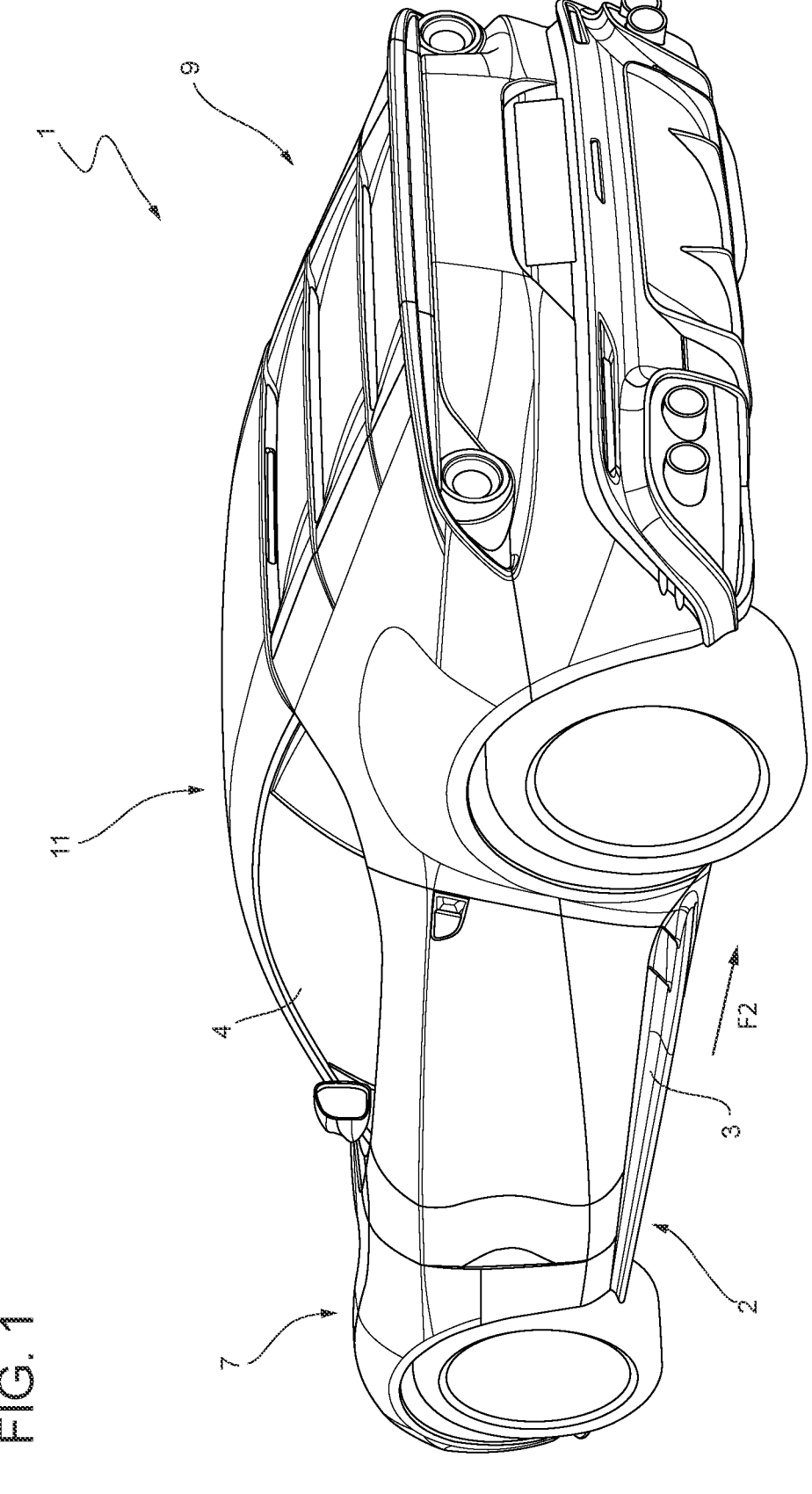
FIG. 1 is a schematic perspective view, with parts removed for clarity, of a preferred embodiment of the car of the present invention.
Figure 2:
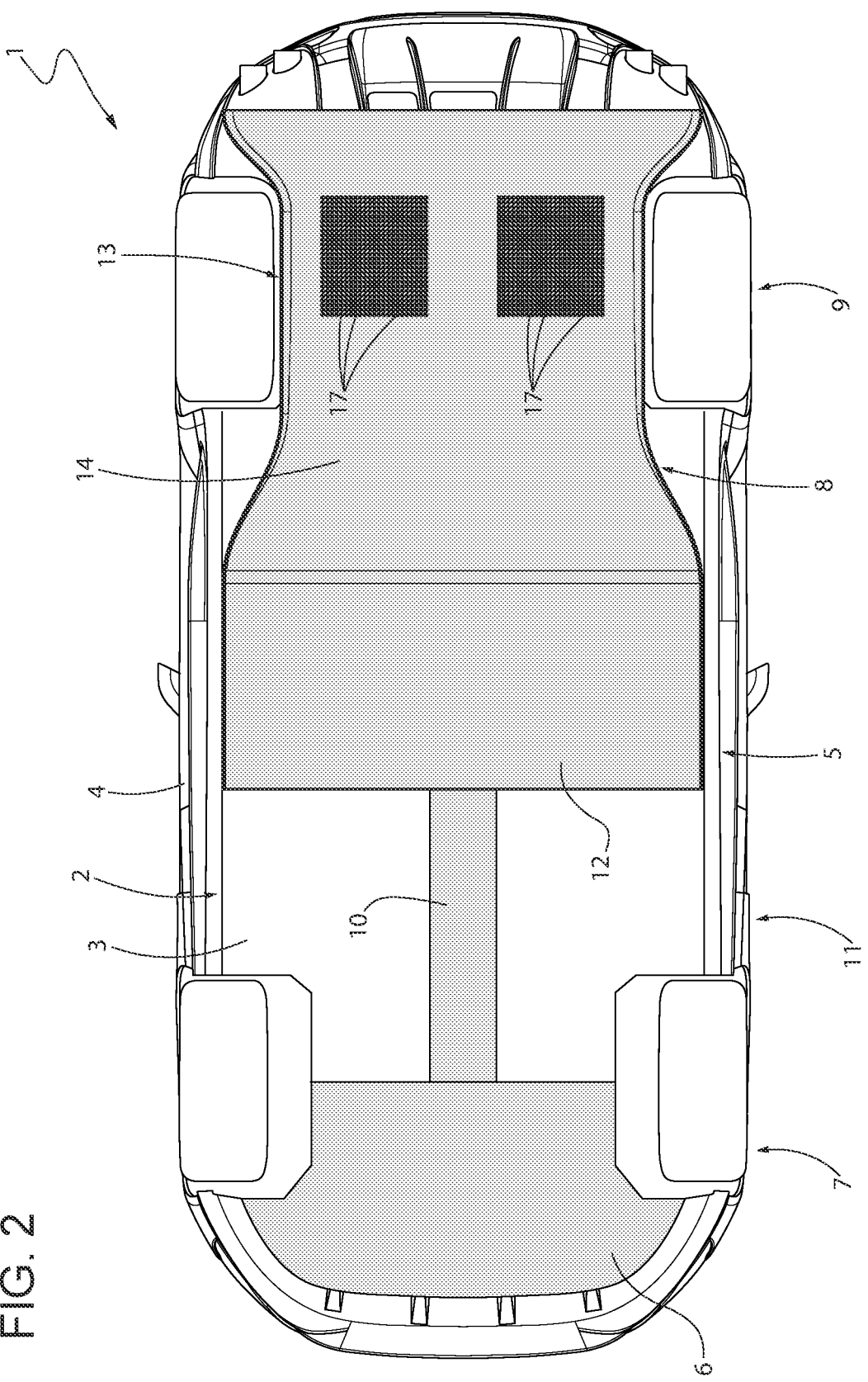
FIG. 2 is a schematic view from below, with parts removed for clarity, of the car in FIG. 1.

With reference to FIGS. 1 and 2, reference number 1 indicates, as a whole, a car, in particular a sports car, comprising a support frame 2 defining part of a lower floor 3 of the car 1.

The car 1 also comprises a passenger compartment 4 mounted on the frame 2 and projecting upwards from the floor 3, and an aerodynamic bottom 5 partially fixed to the frame 2 and defining part of the floor 3.

The bottom 5 comprises a front bottom 6 fixed to the frame 2 in a front zone 7 of the car 1, a rear bottom 8 fixed to the frame 2 in a rear zone 9 of the car 1, and an elongated central bottom 10 fixed to the frame 2 between the bottoms 6 and 8 and in a central zone 11 of the car 1.

The car 1 also comprises a known driving engine (not shown), which is mounted in the centre of the rear zone 9 and is connected to the frame 2 by interposing a known elastic shock-absorbing device (not shown) so as to have at least one degree of freedom relative to the frame 2 during the normal operation of the car 1.

Figure 3:
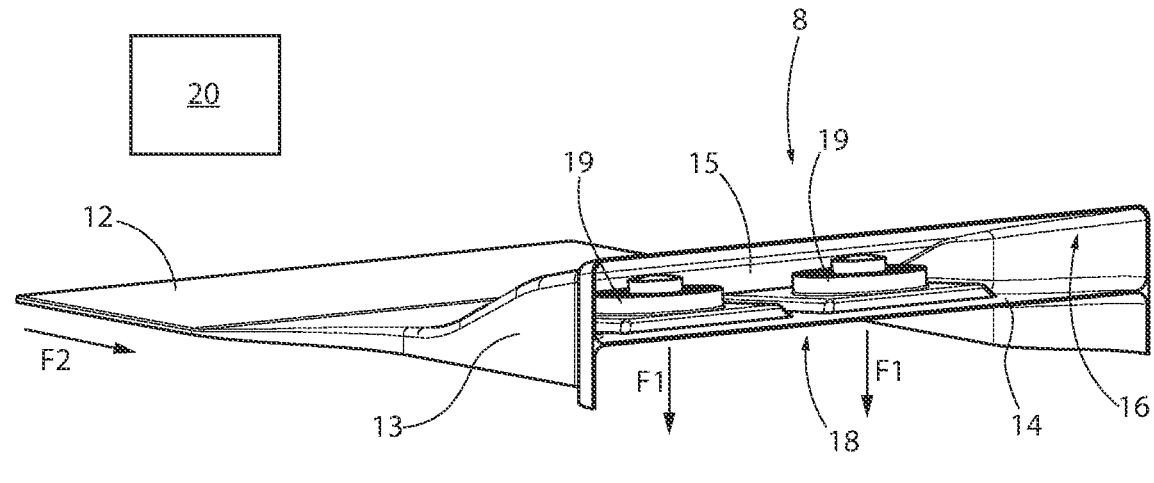
FIG. 3 is a schematic perspective view, with parts removed for clarity, of a detail of the car in FIG. 1.
Figure 4:
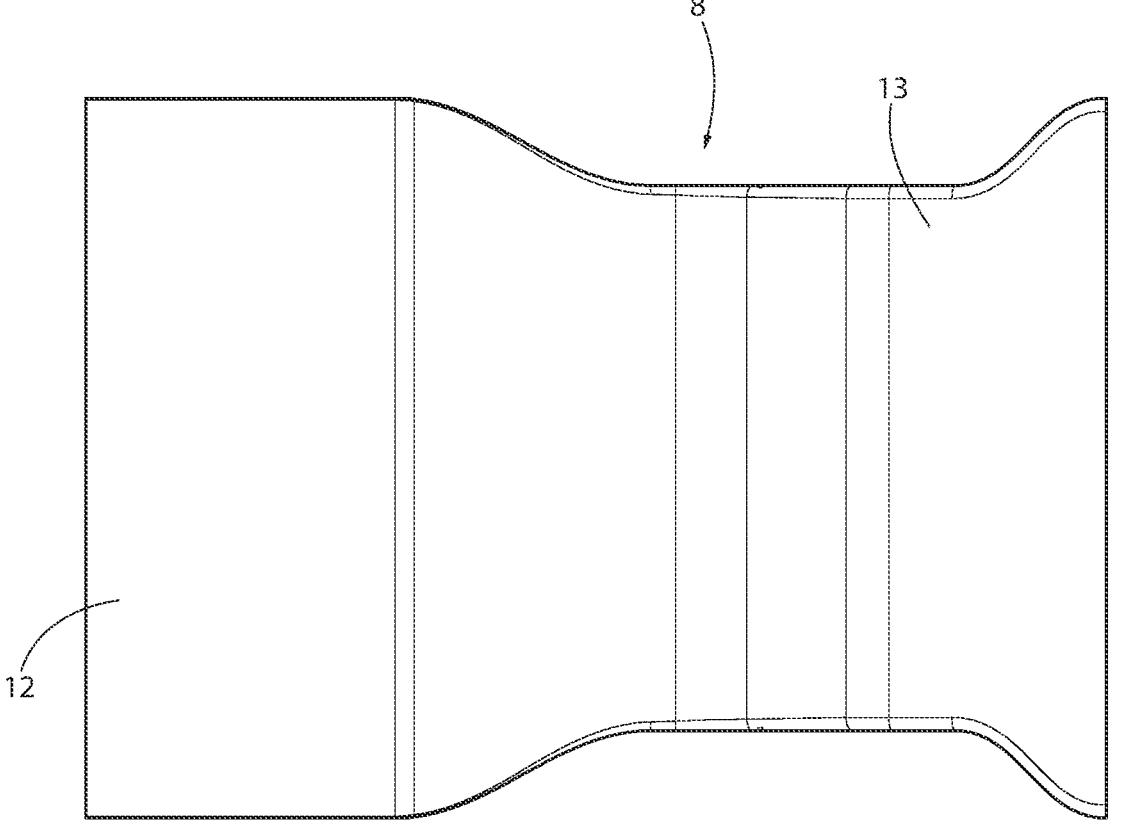
FIG. 4 is a schematic plan view of the detail in FIG. 3, with parts removed for clarity.

According to what is shown in FIGS. 2, 3, and 4, the rear bottom 8 comprises a front plate 12 and a rear, box-shaped body 13 arranged in succession along the rear zone 9 of the car 1.

The body 13 is delimited by a lower wall 14 facing a road surface (not shown), and is configured to define a pneumatic chamber 15, which communicates with the outside environment both via an open rear end 16 and multiple openings 17 made through the wall 14.

The chamber 15 defines part of a pneumatic unit 18 comprising, in addition, in this case, a pair of fans 19 mounted inside the chamber 15 at respective, multiple openings 17.

Each fan 19 is a reversible fan that has a first operating mode, wherein the fan 19 is driven to blow an air flow F1 outside the chamber 15 through the openings 17 and in the direction of the road surface (not shown), and a second operating mode, wherein the fan 19 is driven to suck part of an air flow F2 circulating below the floor 3, from the front zone 7 to the rear zone 9, inside the chamber 15 during normal operation of the car 1.

The car 1 also comprises an electronic control unit 20 configured to selectively control the operation of the fans 19 and, thus, the blowing of the air flow F1 and the suction of part of the air flow F2 as a function of an operating parameter, for example the speed, of the car 1 and/or of a geometrical parameter of a forward path (not shown) of the car 1.

According to a variant not shown, the fans 19 are eliminated and replaced one with a blowing pneumatic device, in particular a fan, driven to blow the air flow F1 outside the chamber 15 in the direction of the road surface (not shown) and the other with a sucking pneumatic device, in particular a fan, driven to suck part of the air flow F2 inside the chamber 15.

The blowing of the air flow F1 and/or the suction of part of the air flow F2 modify the air flow F2 and, thus, the vertical aerodynamic load and the aerodynamics of the car 1.

Figure 5:
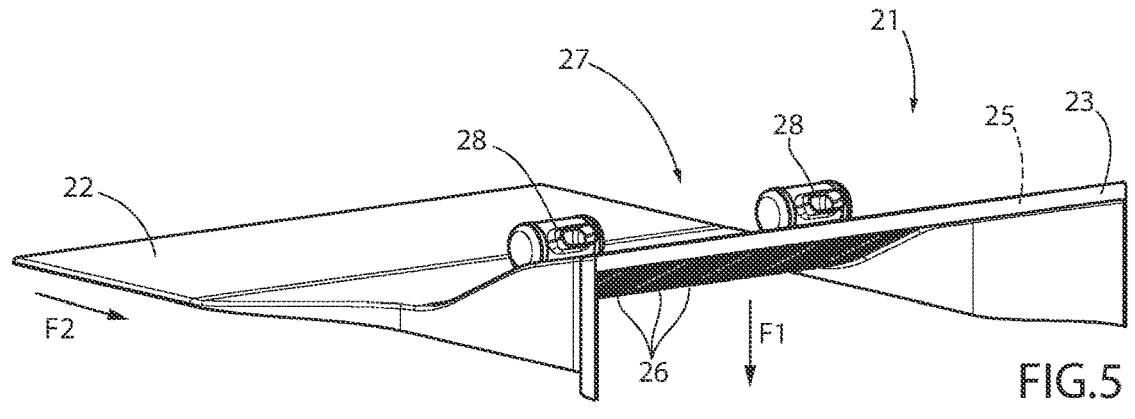
FIG. 5 is a schematic perspective view, with parts removed for clarity, of a variant of the detail in FIG. 3.
Figure 6:
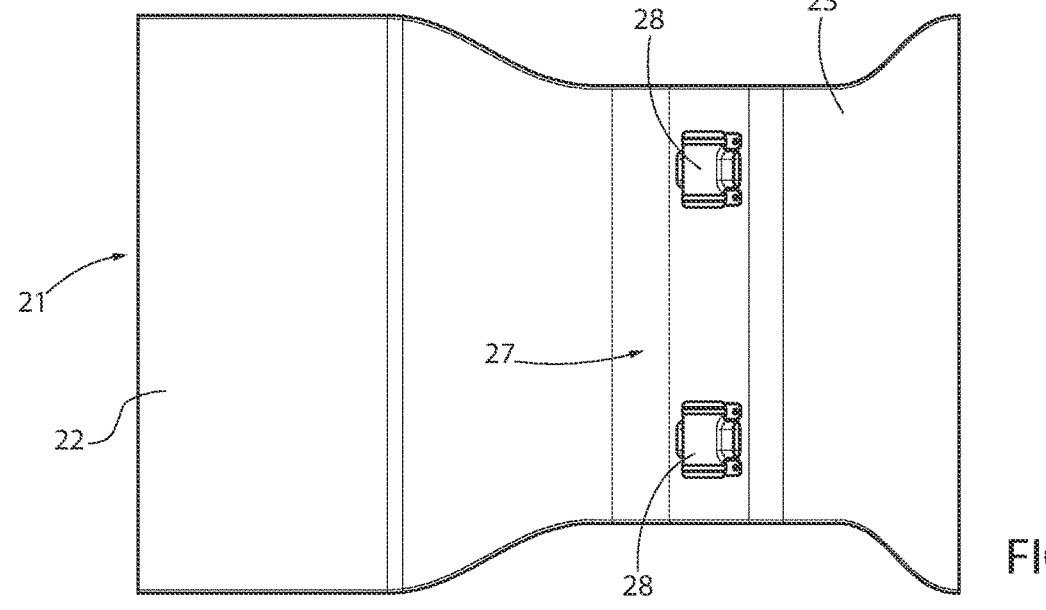
FIG. 6 is a schematic plan view, with parts removed for clarity, of the variant in FIG. 5.
Figure 7:
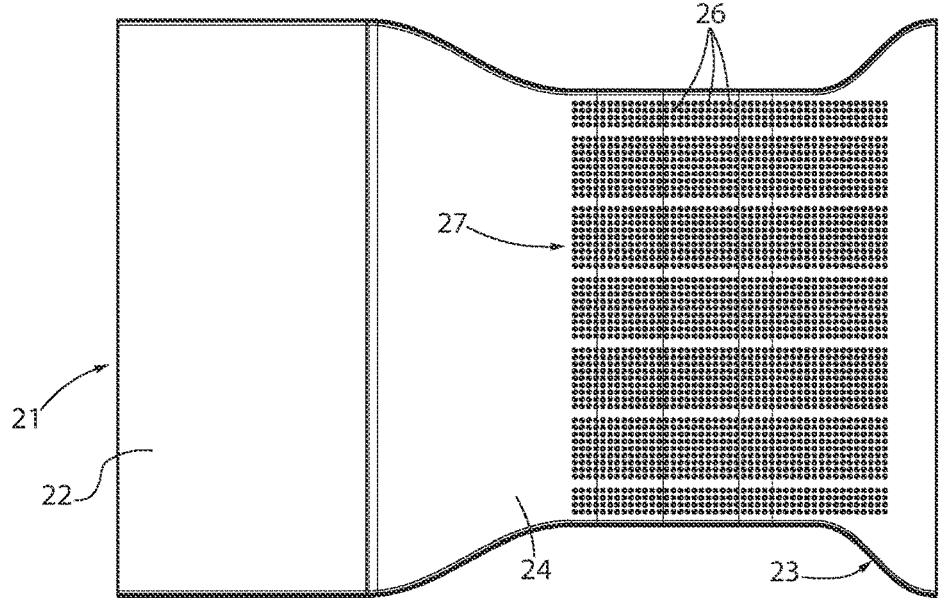
FIG. 7 is a schematic view from below, with parts removed for clarity, of the variant in FIG. 5.

The variant shown in FIGS. 5, 6, and 7 differs from what is shown in the previous figures solely due to the fact that, in it, the rear bottom 8 is eliminated and replaced with a rear bottom 21 comprising a front plate 22 and a rear, box-shaped body 23 arranged in succession along the rear zone 9 of the car 1.

The body 23 is delimited by a lower wall 24 facing the road surface (not shown), and defines a closed pneumatic chamber 25, which communicates with the outside environment via multiple openings 26 made through the wall 24.

The chamber 25 defines part of a pneumatic unit 27 comprising, in addition, in this case, a pair of pneumatic devices 28 mounted outside the chamber 25.

Each device 28 is a reversible pneumatic device that has a first operating mode, wherein the device 28 is driven to blow the air flow F1, firstly, through the chamber 25 and, then, through the openings 26 in the direction of the road surface (not shown), and a second operating mode, wherein the device 28 is driven to suck part of the air flow F2, firstly, inside the chamber 25 and, then, through the device 28.

Alternatively, the devices 28 are driven one with the first operating mode and the other with the second operating mode.

The electronic control unit 20 is configured to selectively control the operation of the devices 28 and, thus, the blowing of the air flow F1 and the suction of part of the air flow F2 as a function of an operating parameter, for example the speed, of the car 1 and/or of a geometrical parameter of a forward path (not shown) of the car 1.

The blowing of the air flow F1 and/or the suction of part of the air flow F2 modify the air flow F2 and, thus, the vertical aerodynamic load and the aerodynamics of the car 1.

With reference to what is described above, it is also useful to specify that the blowing of the air flow F1 enables cleaning of the lower walls 14, 24, ensuring the correct operation of the rear bottoms 8, 21.

The invention claimed is:

1. A car comprising a support frame (2) defining part of a lower floor (3) of the car; a passenger compartment (4) projecting upwards from the lower floor (3); a driving engine to move the car; and an aerodynamic bottom (5), which is at least partly fixed to the support frame (2), defines part of the lower floor (3) and comprises, in turn, a rear bottom (8; 21) mounted in the area of a rear zone (9) of the car; and characterized in that the rear bottom (8; 21) is provided with a pneumatic unit (18; 27) configured to blow a first air flow (F1) in the direction of a road surface and/or to suck part of a second air flow (F2) flowing under the lower floor (3) during the normal operation of the car.

2. The car according to claim 1, wherein the pneumatic unit (18; 27) comprises at least one reversible pneumatic device (19; 28) configured both to blow the first air flow (F1) in the direction of the road surface and to suck part of the second air flow (F2).

3. The car according to claim 1, wherein the pneumatic unit (18; 27) comprises a blowing pneumatic device (19; 28) to blow the first air flow (F1) and/or a sucking pneumatic device (19; 28) to suck part of the second air flow (F2).

4. The car according to claim 1, wherein the pneumatic unit (18; 27) comprises a pneumatic chamber (15; 25) obtained in the rear bottom (8; 21) and a plurality of openings (17; 26) obtained through a lower wall (14; 24) of the rear bottom (8; 21) in order to connect the pneumatic chamber (15; 25) to the outside under the lower floor (3).

5. The car according to claim 4, wherein the pneumatic unit (18; 27) comprises at least one reversible pneumatic device (19; 28), which is configured both to blow the first air flow (F1) in the direction of the road surface and to suck part of the second air flow (F2).

6. The car according to claim 5, wherein the pneumatic chamber (25) is closed and communicates with the outside only through said openings (26); the reversible pneumatic device (28) being mounted on the outside of the pneumatic chamber (25).

7. The car according to claim 5, wherein the pneumatic chamber (15) is open in the area of a rear end (16) of its; the reversible pneumatic device (19) being mounted on the inside of the pneumatic chamber (15).

8. The car according to claim 4, wherein the pneumatic unit (18; 27) comprises a blowing pneumatic device (19; 28) to blow the first air flow (F1) and/or a sucking pneumatic device (19; 28) to suck part of the second air flow (F2).

9. The car according to claim 8, wherein the pneumatic chamber (25) is closed and communicates with the outside only through said openings (26); the blowing pneumatic device (28) and/or the sucking pneumatic device (28) being mounted on the outside of the pneumatic chamber (25).

10. The car according to claim 8, wherein the pneumatic chamber (15) is open in the area of a rear end (16) of its; the blowing pneumatic device (19) and/or the sucking pneumatic device (19) being mounted on the inside of the pneumatic chamber (15).

* * * * *